United States Patent
Unnerstall et al.

(10) Patent No.: US 10,867,300 B2
(45) Date of Patent: Dec. 15, 2020

(54) SYSTEMS AND METHODS FOR CREATING AND MONITORING GEOFENCE ZONES

(71) Applicant: MasterCard International Incorporated, Purchase, NY (US)

(72) Inventors: Rick Unnerstall, O'Fallon, MO (US); Bradley Kenneth Dickinson, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 674 days.

(21) Appl. No.: 15/342,862

(22) Filed: Nov. 3, 2016

(65) Prior Publication Data
US 2018/0121913 A1 May 3, 2018

(51) Int. Cl.
  *G06Q 20/40* (2012.01)
  *H04W 4/021* (2018.01)
  *H04L 29/06* (2006.01)
  *G06Q 20/32* (2012.01)

(52) U.S. Cl.
  CPC ......... *G06Q 20/40* (2013.01); *G06Q 20/3224* (2013.01); *G06Q 20/405* (2013.01); *H04L 63/107* (2013.01); *H04W 4/021* (2013.01)

(58) Field of Classification Search
  CPC .. G06Q 20/40; G06Q 20/3224; G06Q 20/405; H04L 63/107; H04W 4/021
  See application file for complete search history.

(56) References Cited

U.S. PATENT DOCUMENTS

| 8,086,519 | B2 | 12/2011 | Mylet et al. |
| 8,438,066 | B1 | 5/2013 | Yuen et al. |
| 9,380,421 | B1 | 6/2016 | Vltavsky |
| 9,544,075 | B2* | 1/2017 | Altman ................ H04W 12/02 |
| 9,860,697 | B2* | 1/2018 | Frenz ................... H04W 4/021 |
| 10,097,953 | B1* | 10/2018 | Hartman ............... H04W 4/021 |
| 10,123,163 | B2* | 11/2018 | Kernan ................. H04W 4/029 |
| 2012/0209773 | A1* | 8/2012 | Ranganathan ......... G06Q 20/40 705/44 |

(Continued)

OTHER PUBLICATIONS

Why Geofencing is Perfect for Financial Services (Year: 2016).*
PCT International Search Report and Written Opinion, Application No. PCT/US2017/056011, dated Dec. 15, 2017, 12 pps.

*Primary Examiner* — Bruce I Ebersman
(74) *Attorney, Agent, or Firm* — Armstrong Teasdale LLP

(57) ABSTRACT

A geofence computing device for creating and monitoring geofence zones is described herein. The geofence computing device includes a processor and a memory. The processor is configured to receive geofence data from the user device, the geofence data including a user defined geofence zone and a geofence rule. The processor is also configured to receive transaction data. The processor is further configured to determine a geographic location of the merchant. The processor is also configured to retrieve the geofence data from the memory and compare the merchant geographic location to the user defined geofence zone. The processor is further configured to apply the geofence rule based on the comparison of the merchant geographic location to the user defined geofence zone. The processor is also configured to add a flag to the authorization request message indicating whether the transaction satisfies or violates the geofence rule.

23 Claims, 7 Drawing Sheets

(56) References Cited

U.S. PATENT DOCUMENTS

| | | | |
|---|---|---|---|
| 2013/0013484 A1 | 1/2013 | Mylet et al. | |
| 2014/0279494 A1 | 9/2014 | Wiesman et al. | |
| 2015/0081349 A1* | 3/2015 | Johndrow | G06Q 20/3224 |
| | | | 705/5 |
| 2015/0120440 A1* | 4/2015 | Jung | G06Q 30/0253 |
| | | | 705/14.51 |
| 2015/0223023 A1* | 8/2015 | Das | G06F 16/444 |
| | | | 455/457 |
| 2015/0365799 A1* | 12/2015 | Sheha | G01C 21/20 |
| | | | 455/456.3 |
| 2016/0125400 A1 | 5/2016 | Hu et al. | |
| 2017/0091765 A1* | 3/2017 | Lloyd | G06Q 20/32 |
| 2017/0241788 A1* | 8/2017 | Chin | G01C 21/3644 |

* cited by examiner

SYSTEMS AND METHODS FOR CREATING AND MONITORING GEOFENCE ZONES

BACKGROUND OF THE DISCLOSURE

This disclosure relates generally to geofence zones and, more specifically, to systems and methods for creating and monitoring geofence zones.

When a fraudulent transaction occurs using a payment card, such as a credit card, it can often cause harm to not only the account holder, but also to the merchant involved in the transaction and the issuer of the payment account. As such, many issuers offer services to their cardholders to help prevent fraud or to more quickly identify when a fraudulent transaction occurs, in order to remedy the situation. Many merchants also take measures to try and prevent such fraudulent transactions from taking place. In one such solution, issuers deny authorization for transactions when a transaction originates in a state that is different than the one where the legitimate cardholder resides.

Unfortunately, these types of solutions that are based upon the state where the cardholder's residence is located as compared to the state where the merchant involved in the purchase is located, do not work well for cardholders that regularly travel out-of-state or for those cardholders that live near a state border or have multiple residences. In these cases, the cardholder have to repeatedly contact their issuer bank when making purchases outside of their state of residence so that these purchases are not always being declined, or the cardholder may have to obtain a separate payment card for each location.

Accordingly, these known systems and methods for trying to prevent fraudulent transactions are unsuitable for these types of account holders. Thus, there is a need for a technical solution to improve the identification of fraud factors for account holders making purchases outside of their home area.

BRIEF DESCRIPTION OF THE DISCLOSURE

In one aspect, a geofence computing device for creating and monitoring geofence zones is provided. The geofence computing device is in communication with a user device and a payment processor. The geofence computing device includes a memory and a processor in communication with the memory. The processor is configured to receive geofence data from the user device. The geofence data includes a user defined geofence zone, a user defined geofence rule associated with the geofence zone, and an account identifier of a user associated with the geofence zone. The geofence zone is a geographic area, and wherein the geofence rule is a transaction limitation. The processor is also configured to store the geofence data within the memory. The processor is further configured to receive, from the payment processor, transaction data associated with the account identifier and included within an authorization request message. The transaction data represents a payment transaction initiated by the user with a merchant, the transaction data including at least one of a merchant location and a merchant identifier. The processor is also configured to determine a geographic location of the merchant. The processor is further configured to retrieve the geofence data from the memory based upon the account identifier including the user defined geofence zone. The processor is also configured to compare the merchant geographic location to the user defined geofence zone. The processor is further configured to apply the geofence rule based on the comparison of the merchant geographic location to the user defined geofence zone. The processor is also configured to add a flag to the authorization request message indicating whether the transaction satisfies or violates the geofence rule.

In another aspect, a computer-implemented method for creating and monitoring geofence zones is provided. The method is implemented using a geofence computing device including a processor in communication with a memory, a user device, and a payment processor. The method includes receiving geofence data from the user device. The geofence data including a user defined geofence zone, a user defined geofence rule associated with the geofence zone, and an account identifier of the user associated with the geofence zone. The geofence zone is a geographic area, and the geofence rule is a transaction limitation. The method also includes storing the geofence data within the memory. The method further includes receiving transaction data associated with the account identifier and included within an authorization request message. The transaction data represents a payment transaction initiated by the user with a merchant. The transaction data includes at least one of a merchant location and a merchant identifier. The method also includes determining a geographic location of the merchant. The method further includes retrieving the geofence data from the memory based upon the account identifier including the user defined geofence zone. The method also includes comparing the merchant geographic location to the user defined geofence zone. The method further includes applying the geofence rule based on the comparison of the merchant geographic location to the user defined geofence zone. The method also includes adding a flag to the authorization request message indicating whether the transaction satisfies or violates the geofence rule.

In yet another aspect, at least one non-transitory computer-readable storage media having computer-executable instructions embodied thereon is provided. When executed by a geofence computing device including a processor in communication with a memory, a user device, and a payment processor, the computer-executable instructions cause the geofence computing device to receive geofence data from the user device. The geofence data including a user defined geofence zone, a user defined geofence rule associated with the geofence zone, and an account identifier of the user associated with the geofence zone. The geofence zone is a geographic area, and the geofence rule is a transaction limitation. The computer-executable instructions also cause the geofence computing device to store the geofence data within the memory. The computer-executable instructions further cause the geofence computing device to receive transaction data associated with the account identifier and included within an authorization request message. The transaction data represents a payment transaction initiated by the user with a merchant. The transaction data includes at least one of a merchant location and a merchant identifier. The computer-executable instructions also cause the geofence computing device to determine a geographic location of the merchant. The computer-executable instructions further cause the geofence computing device to retrieve the geofence data from the memory based upon the account identifier including the user defined geofence zone. The computer-executable instructions also cause the geofence computing device to compare the merchant geographic location to the user defined geofence zone. The computer-executable instructions further cause the geofence computing device to apply the geofence rule based on the comparison of the merchant geographic location to the user defined geofence zone. The computer-executable instructions also cause the geofence computing device to add a flag to the authorization request message indicating whether the transaction satisfies or violates the geofence rule.

BRIEF DESCRIPTION OF THE DRAWINGS

FIG. 1 is a simplified block diagram of a geofence creation and monitoring system that includes a geofence computing device for creating and monitoring transactions initiated within geofence zones.

FIG. 2 illustrates an example configuration of a user system operated by a user shown in FIG. 1.

FIG. 3 illustrates an example configuration of a server system such as the geofence computing device shown in FIG. 1.

FIG. 4 is an example map of zones created by the geofence computing device shown in FIG. 1, and displayed in a website and/or a computer application.

FIG. 5 is an example method for creating and monitoring transactions initiated within a geofence zone using the geofence computing device shown in FIG. 1.

FIG. 6 shows an example configuration of a database within a computing device, along with other related computing components, that may be used to create, organize, and monitor zones created using the geofence computing device shown in FIG. 1.

DETAILED DESCRIPTION OF THE DISCLOSURE

The systems and methods described herein enable users (e.g., cardholders) to create and organize geofence zones for one or more payment cards using a geofence computing device. The geofence computing device applies the created geofence zones to future purchases made with the one or more payment cards, such that purchases made outside an all-spend geofence zone or outside a target-spend geofence zone, or inside a no-spend geofence zone, are flagged as being potentially higher risk for fraud. The geofence computing device includes a memory device and a processor in communication with a payment network. The geofence computing device is configured to receive transaction information for a plurality of cardholders from the payment network. As further described below, the geofence computing device includes an analytics module for analyzing transaction data of a cardholder to make merchant recommendations and/or zone recommendations, a zone altering module for altering a geofence zone based on transaction data and/or cardholder input, and an alert module for transmitting an alert to a cardholder and/or an issuer. A cardholder, using the geofence computing device, creates and/or organizes geofence zones (hereafter referred to as "zones") to manage transaction authorizations as the cardholder travels in order to prevent fraud. The geofence computing device further uses actual transaction data to modify or create zones that more accurately reflect the actual spend patterns for the cardholder.

In the example embodiment, an issuer and/or the geofence computing device provides a customized website accessible using a web browser and/or a software application that can be downloaded and installed on a computing device, referred to as a "service app." The customized website and/or the service app provide certain features, functions, and/or services to the cardholder for creating and organizing zones, as described herein.

Figure 5:
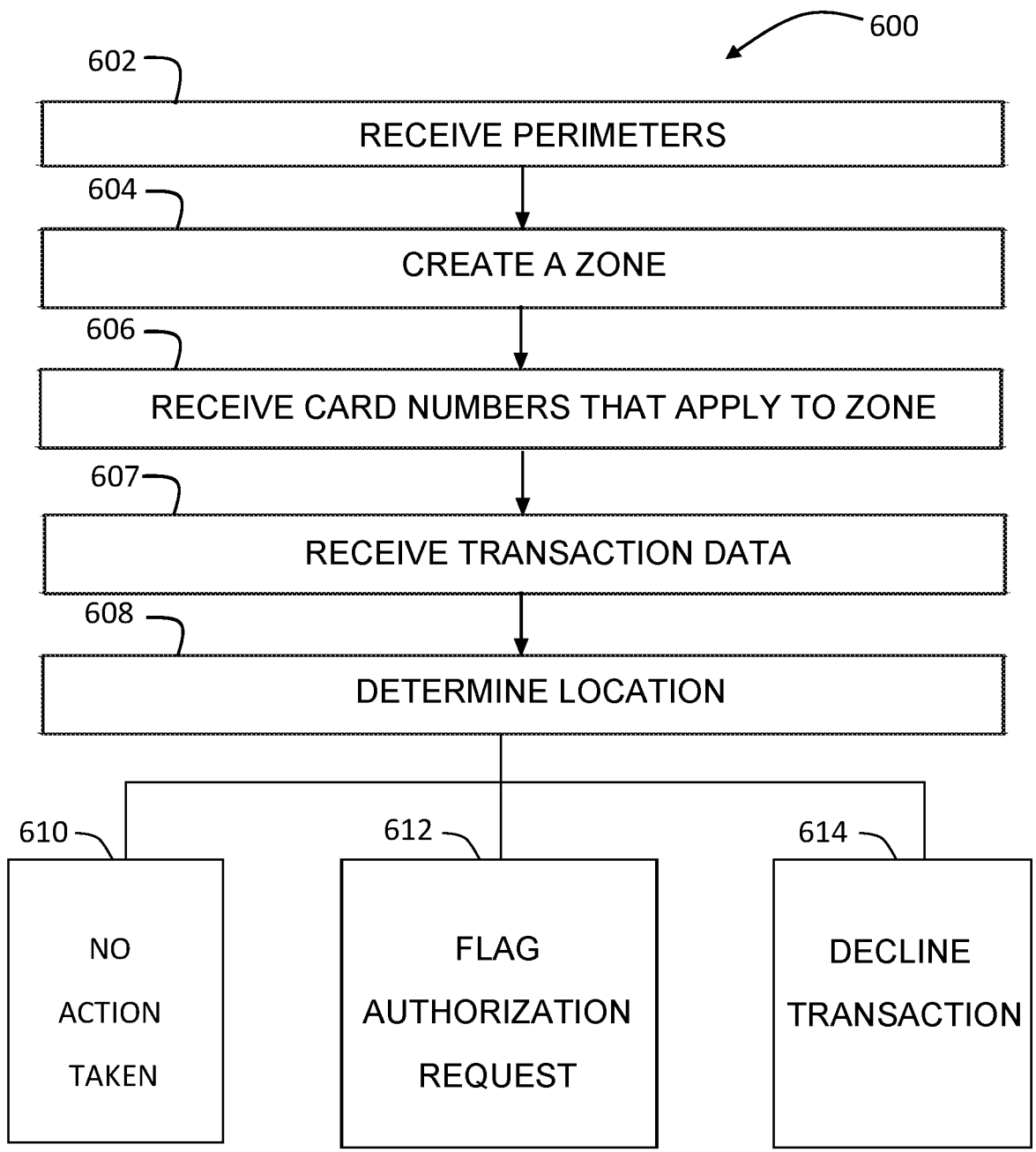

In the example embodiment, a cardholder uses the customized website or the service app in communication with the geofence computing device to create one or more zones for one or more payment cards. The geofence computing device receives geofence data from the customized website or the service app. In one embodiment, the geofence computing device is configured to receive from the cardholder a location, such as a zip code, and a zone radius (i.e., 50 miles), etc. In such an embodiment, the geofence computing device is configured to designate a center point of the location (i.e., a center point of the zip code) and apply the zone radius from the center point. In an alternative embodiment, the cardholder is enabled to specify a zone to the geofence computing device by specifying a point location, for example by entering an address or coordinates, and indicating a zone radius from the specified point. In an additional embodiment, the cardholder can specify the zone boundary by using an input device to draw a zone perimeter on a map displayed in the customized website and/or the service app, such as shown in FIG. 5. In still another embodiment, the geofence computing device is configured to receive city, state, county, and/or municipality information entered by the cardholder.

The geofence computing device is configured to create the zone (also referred to as a "user defined geofence zone") based on one of the methods described above (i.e., a location and a zone radius, a zone perimeter drawn on a map, or city, state, and/or municipality lines, received by the geofence computing device). The geofence computing device then stores the zone into the memory. In the example embodiment, the geofence computing device is configured to receive from the cardholder one or more account identifiers, such as a payment account number (PAN) of a payment card or cards, which apply to the zone. In another embodiment, the geofence computing device is configured to receive from the cardholder a digital wallet (including one or more PANs) to apply to the zone. The cardholder can create as many zones as desired using the procedure described above.

A zone is a boundary that surrounds a geographic area. The zone can be substantially circular or polygonal or any other shape. A zone can also include multiple areas that are not contiguous, or can include multiple areas that are connected along roads of travel.

As described below, these zones are linked to transaction rules that are stored in memory. Thus, parties can be notified when a zone is violated (e.g., such as when a transaction occurs outside the zone). Notification of geofence violations in this manner can serve to limit or prevent theft and fraud, such as by promptly alerting an issuer that a transaction may be fraudulent.

The geofence computing device is further configured to receive from the cardholder a zone type for each zone (also referred to as a user defined geofence rule associated with the zone). Zone types include, but are not limited to, (i) a no-spend zone in which the geofence computing device triggers an alert or declines a transaction authorization request if the transaction occurs within the no-spend zone or if the transaction is initiated with a specific type of merchant (e.g., no spend on alcoholic beverages); (ii) an all-spend zone in which the geofence computing device allows unlimited spending within the all-spend zone and triggers an alert or declines a transaction authorization request if the transaction occurs outside the all-spend zone, and (iii) a target-spend zone in which the geofence computing device only allows transactions at specific merchants or within specific merchant categories (e.g., transactions including gasoline purchases) within the target-spend zone and triggers an alert or declines a transaction authorization request if the transaction originates with an unspecified merchant within the target-spend zone.

The geofence computing device enables the cardholder to bundle two or more zones together to manage them as a group to better mirror the cardholder's travel patterns. For example, a cardholder can create several zones and limit a payment card to those zones. The cardholder may create names or titles for each zone and/or each bundled zone for identification purposes. Each zone can be used to manage one or more payment cards or a digital wallet. As further described below, one or more time rules (also referred to as zone time constraints) can also be incorporated with one or more zones. For example, one zone may be a no spend zone from Monday to Thursday, but may be a target spend zone from Friday to Monday.

In one embodiment, the payment processor receives payment transactions for processing made by cardholders at merchants. The payment processor stores data associated with these payment transactions in a database. The geofence computing device, in communication with the payment processor and/or the payment network database, receives the transaction data in real-time. The transaction data includes at least data associated with the cardholder (e.g., an account identifier such as a payment card number of the payment card used to conduct the payment transaction, or a PAN), the merchant (e.g., a merchant identifier provided during the transaction) involved in the transaction, a merchant category that identifies a type of merchant, a geographic location of the merchant, and a date and a time for the transaction.

In the example embodiment, when the geofence computing device receives transaction data from the payment processor, the geofence computing device searches the memory for an account identifier (e.g., a PAN) associated with one or more zones that matches the account identifier used in the transaction. The geofence computing device retrieves the one or more zones associated with the account identifier used in the transaction. The geofence computing device then determines, using the geographic location of the merchant provided in the transaction data, whether the cardholder is inside or outside the one or more zones. The system is configured to determine the location of the merchant based upon the transaction data, wherein the transaction data includes an actual address of the merchant, a geolocation of the merchant, or a name of the merchant that can be looked-up to retrieve the address. The system then uses this address as the address where the cardholder is located, and compares the address to the geofence zones stored in the memory for the cardholder.

In an alternative embodiment, the geofence computing device determines whether a cardholder is inside or outside a zone by receiving a location determination of a cardholder's wireless device (e.g., smartphones, tablets, wearables, and other mobile computing devices). The geofence computing device compares the location determination to one or more zones associated with the cardholder stored in memory. The location determination is determined based on wireless data and/or based on other geolocation data (alternately referred to herein as "geographic location data") such as electronic device location data, geotemporal data, or geopositioning data, as defined below. For example, a primary account number (PAN) of the cardholder may be paired with the cardholder's smartphone (e.g., via a unique device ID). This pairing of a wireless device ID to a PAN may be achieved by, for example, a cardholder registering their wireless device ID to the PAN assigned to the cardholder. In another embodiment, through identification of the cardholder, the mobile device of the cardholder is also identified, namely in the case where the cardholder has registered the mobile device with the card number and/or in the case where the geofence computing device has automatically linked the mobile device to the PAN.

As used herein, the term "geolocation" refers to a user's location as collected from a cell phone tower or beacon, GPS, or other position indicators, and can include GPS coordinates, street address, an IP address, geo-stamps on digital photographs, smartphone check-in or other data, and other location data provided as a result, for example, of a telecommunications or online activity of a user. "Geotemporal" data is temporal and geolocation data (cell phone tower location, IP address, GPS coordinates) that is sent, usually along with other information, from a communications device a user is accessing (such as, a cell phone tower, computer, GPS device, or other mobile device) to perform a certain activity at a particular time. "Geopositioning" data, as used herein, refers to at least one of geolocation and geotemporal data, and can include, for example, the particular location of a mobile device user, the date and time the mobile device user was at that particular location and the duration of the stay at that location. The geopositioning network can include, for example, cellular towers, cellular networks, global positioning system (GPS) providers, GPS networks, mobile device networks, client application (e.g., "app") providers, client application systems, and/or other networks where geopositioning data is collected and/or stored from mobile devices and/or mobile device users.

In the example embodiment, the geofence computing device adds a flag to the authorization request message indicating whether the transaction satisfies or violates a geofence rule. More particularly, when the geofence computing device receives payment transaction data from the payment network and determines that the cardholder, for example, is outside an all-spend or target-spend zone, is inside a no-spend zone, initiated a transaction with a merchant in a merchant category type that is not authorized, or the transaction violates a time rule, the geofence computing device is configured to add a risk flag to an authorization request message (e.g., ISO 8583 authorization message) that is pending to the issuer. The risk flag alerts the issuer that the transaction violates a geofence rule (i.e., the transaction originated from a merchant outside an all-spend or outside a target-spend zone, the transaction originated from a merchant inside a no-spend zone, the transaction originated from a merchant in a merchant category type that is not authorized, or the transaction violates a time rule). The issuer then decides whether to approve the transaction. In an alternative embodiment, the geofence computing device is configured to decline an authorization request for the transaction on behalf of the issuer. In further embodiments, the geofence computing device may only decline an authorization request on behalf of the issuer if certain predefined conditions are met, for example, the transaction is above a predefined amount.

Figure 4:
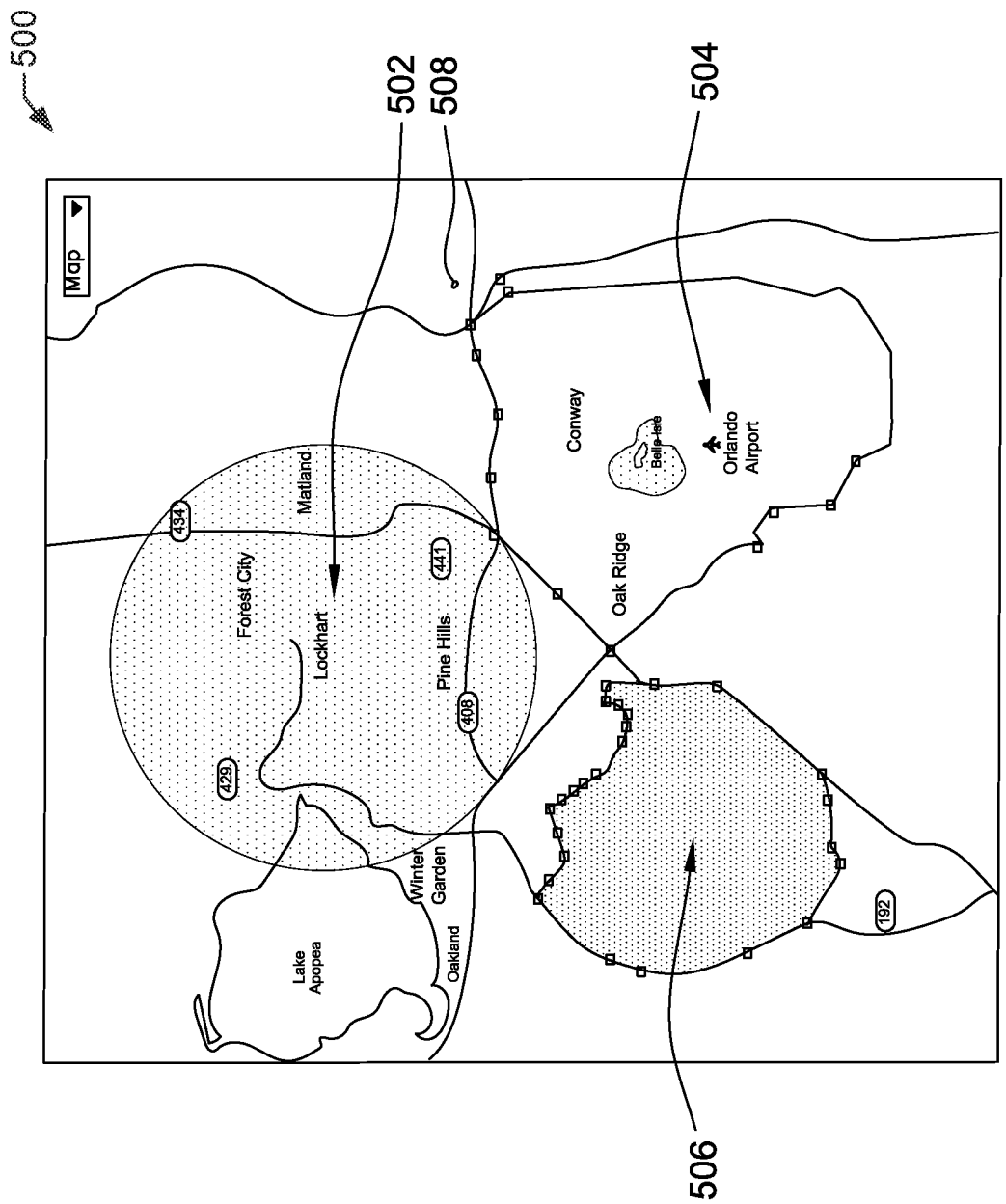

The cardholder can use the customized website and/or the service app in communication with the geofence computing device to view a map of one or more created zones, as shown in FIG. 4. The geofence computing device uses the zone data saved in the memory to display the one or more zones on the map. In some embodiments, different zone types are shaded different colors for easy identification. In additional embodiments, the user can specify a zone (i.e., a geofence boundary) by using an input device to draw a zone perimeter on the map displayed in the customized website and/or the service app, as described above.

In some embodiments, the geofence computing device is configured to apply time rules to monitor one or more zones for a predefined duration (i.e., one month) and/or during predefined hours (i.e., from 9 p.m. to 7 a.m.). As a result, the geofence computing device is configured to turn a zone on and off based on predefined parameters (i.e., dates and times). Different zones can have different time rules. The predefined parameters may be entered into the customized website or the service app by a cardholder and/or determined by an issuer. For example, when creating a zone, the cardholder can use the customized website to enter a range of dates for a zone to be active. In addition, one or more time rules can be incorporated with one or more zones types for a zone. For example, a zone may be a no spend zone from Monday to Thursday, but may be a target spend zone from Friday to Monday.

In one embodiment, the geofence computing device is configured to monitor a location of the cardholder based on a wireless signal associated with the cardholder and to transmit one or more alerts to a cardholder and/or an issuer in the event that the cardholder travels inside or outside a zone and/or transaction activity occurs inside or outside a zone. For example, an alert may be sent to the cardholder when the geofence computing device detects that the cardholder enters a no-spend zone or leaves an all-spend zone. The alert may be transmitted as a SMS text (i.e., a text message) to a mobile phone of the cardholder. The alert may include, but is not limited to, information identifying a zone that the user is entering or leaving.

In another embodiment, when a cardholder travels outside an all-spend zone or a target-spend zone, or inside a no-spend zone, the geofence computing device messages (i.e., alerts) the cardholder and requests whether the cardholder would like to alter the zone or create a new zone before attempting a transaction with a card having a corresponding PAN. For example, the message to the cardholder may be transmitted as Application Programming Interface (API) call or web-based message. In other embodiments, the message may be transmitted using other communication formats, including email messages, SMS messages, and/or any other communication format. As a result, the cardholder may alter an existing zone or create a new zone associated with the cardholder's current location using, for example, the customized website or the service app on a mobile device. The geofence computing device then programmatically alters the existing zone or creates a new zone so that the cardholder may make unflagged transactions.

In one embodiment, the geofence computing device is configured to analyze actual transaction data, including transaction data of a cardholder, in relation to zones previously created by the cardholder to identify merchants that may be of interest to the cardholder. Based on the analysis, the geofence computing device is configured to transmit merchant recommendations to the cardholder. For example, a cardholder frequently shops at a specialty merchant located outside an all-spend zone created by the cardholder. The geofence computing device determines based on other transaction data (e.g., other cardholders) that the specialty merchant has opened a new location that is within the all-spend zone. The geofence computing device is configured to transmit a notification (i.e., an email, a SMS message, etc.) to the cardholder regarding the new store location. The device may also show all such specialty merchants whether inside or outside the cardholder's zone so that the cardholder can approve the merchant as an all-spend merchant (i.e., a target-spend zone merchant) so that the merchant no matter where located is stored as a merchant where the cardholder has approved transactions.

In another embodiment, the geofence computing device is configured to periodically analyze transaction data of a cardholder to analyze the transaction data relative to a zone (i.e., identify transactions made near a zone, outside a zone, or far from a zone) and make zone recommendations to the cardholder, such as recommending that the cardholder create a new zone or enlarge or reduce an existing zone. For example, the geofence computing device may recommend that a cardholder enlarge an existing zone where the geofence computing device determines that the cardholder makes frequent transactions close to, but outside, a radius boundary of an all-spend zone. Conversely, a cardholder may have an existing all-spend zone with a 50 mile radius but makes a plurality of transactions within a 10 mile radius. The geofence computing device may recommend that the cardholder reduce the zone from a 50 mile radius to a 10 mile radius. In an additional embodiment, the geofence computing device is configured to automatically alter the zone based on the transaction data without cardholder involvement. By leveraging the transaction data to make zone recommendations and/or automatically alter zones, the geofence computing device creates more accurate zones over time, thereby reducing fraud.

In one embodiment, cardholders can enable transactions at preferred merchants or places (also known as "white listing") by entering one or more merchant names and/or one or more place names into the customized website or the service app. The geofence computing device receives the one or more names and creates zones (herein referred to as "mini-zones") solely around each named merchant and/or each named place to enable unflagged transactions at the named merchants and/or the named places. For example, a cardholder can enter a name of a shopping mall into the service app, whereupon the geofence computing device creates a mini-zone around the shopping mall. In another embodiment, the geofence computing device analyzes transaction data of a cardholder to determine one or more merchants and/or places frequently visited by the cardholder. The geofence computing device then automatically creates mini-zones around the one or more frequently visited merchants and/or places.

Described herein is an example implementation of creating geofence zones for one or more account identifiers (e.g., PANs) using the geofence computing device described herein. A cardholder accesses a customized website or a service application that is in communication with the geofence computing device. The cardholder enters a home zip code and selects a zone radius of 100 miles. The cardholder creates a first zone, entitled "home zone," based on the home zip code and the 100 miles zone radius. The cardholder designates home zone as an all-spend zone allowing unlimited spending within the home zone. The cardholder then enters a parental zip code for cardholder's parents' home and selects a zone radius of 50 miles. The cardholder creates a second zone, entitled "parent zone," based on the parental zip code and the 50 miles zone radius. The cardholder designates parent zone as an all-spend zone allowing unlimited spending within the zone. The cardholder bundles both home zone and parent zone to a "family" group to manage both zones together. The cardholder applies the family group to all payment cards in a digital wallet. As a result, the cardholder can use the payment cards in a digital wallet to spend in the home zone and the parent zone without any restrictions. The geofence computing device is configured to periodically scan transaction data of the cardholder to determine any transaction outliers and make zone recommendations. For example, the geofence computing device may identify a restaurant regularly frequented by the cardholder that is located two (2) miles outside of the home zone and recommend to the cardholder to enlarge the home zone to include the restaurant within the home zone.

A technical effect of the systems and processes described herein include at least one of: (a) improved accuracy of location tracking of cardholders using GPS sensors and/or transaction data, (b) location alerts tailored to specific consumers to optimize the frequency of generating location alerts, reducing data storage and processing (e.g., bandwidth) requirements required for unnecessary alerts, and (c) reducing the likelihood that fraudulent payment card transactions will be approved, thereby reducing network bandwidth, time, and resources required to correct such fraudulent transactions.

The technical effects and advantages achieved by this system is at least one of: (a) reducing the likelihood that fraudulent payment card transactions will be approved, thereby reducing network bandwidth, time, and resources required to correct such fraudulent transactions; and (b) monitoring transactions for potential fraud for cardholders, issuers, merchants, and acquirers.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, wearables, smartphones, personal digital assistants (PDAs), key fobs, and/or any other computing devices capable of storing and providing account data. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
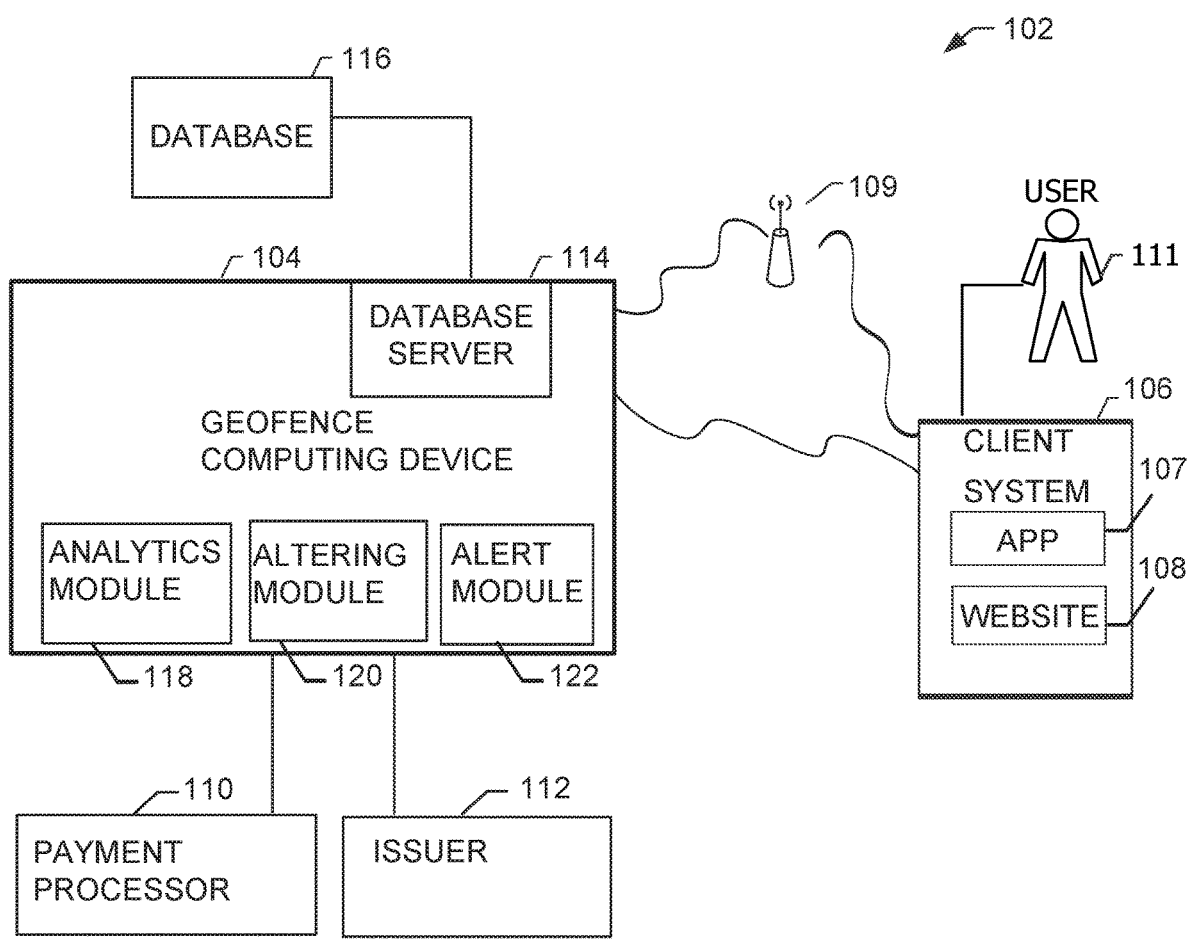
FIGS. 1-6 show example embodiments of the methods and systems described herein.

FIG. 1 is a simplified block diagram of a geofence creation and monitoring system 102 that includes a geofence computing device 104 for creating and monitoring geofence zones. System 102 includes geofence computing device 104 in communication with a plurality of client systems 106 (only one client system 106 shown in FIG. 1). In the example embodiment, client system 106 is a mobile device, such as any mobile device capable of interconnecting to the Internet including a web-based phone, also referred to as smart phone, personal digital assistant (PDA), tablets, or other web-based connectable equipment. In an alternative embodiment, client system 106 is a desktop computer or a laptop computer. Client system 106 may be associated with a user 111, for example, a cardholder. Client system 106 may be interconnected to the Internet through a variety of interfaces including a network, such as a local area network (LAN) or a wide area network (WAN), dial-in connections, cable modems and special high-speed ISDN lines. In some embodiments, client system 106 includes a software application 107 (i.e., a service app) installed on client system 106. In additional embodiments, client system 106 includes a customized website 108 accessible by a web browser installed on client system 106. In further embodiments, client system 106 is in communication with a geopositioning network 109 to facilitate GPS functionality of client system 106. As described above, geofence computing device 104 receives and collects geopositioning data from client system 106.

In the example embodiment, geofence computing device 104 is in communication with payment processor 110 and/or issuer 112. Payment processor 110 and/or geofence computing device 104 may be associated with an interchange network (not shown). Geofence computing device 104 is configured to collect transaction data from payment processor 110. In further embodiments, geofence computing device 104 is configured to decline a request for a transaction authorization on behalf of an issuer 112 where, for example, the cardholder is determined to be in a no-spend zone or outside an all-spend zone.

A database server 114 is connected to database 116, which contains information on a variety of matters, as described below in greater detail. In one embodiment, centralized database 116 is stored on geofence computing device 104. In an alternative embodiment, database 116 is stored remotely from geofence computing device 104 and may be non-centralized. Database 116 may store transaction data conducted over payment processor 110 including data relating to merchants, merchant locations, and cardholders. Database 116 also store cardholder data relating to zone creation and organization. In particular, database 116 stores zones created by cardholders, wherein each zone is associated with one or more account identifiers, such as payment card numbers, of a cardholder. In some embodiments, database 116 stores data necessary to host the customized website and/or the service app accessible by cardholders for zone creation and organization.

In the example embodiment, geofence computing device 104 is configured to receive transaction data from payment processor 110. In another embodiment, geofence computing device 104 is further configured to receive geopositioning data from geopositioning network 109. Geopositioning network 109 may be a component in a larger geopositioning network. Geofence computing device 104 is configured to determine whether a cardholder is inside or outside of a zone based on the transaction data and/or the geopositioning data, as described above. Geofence computing device 104 is further configured to flag purchases made outside an all-spend or target-spend zone, or inside a no-spend zone, as being potentially higher risk for fraud.

Geofence computing device 104 further includes an analytics module 118, a zone altering module 120, and an alert module 122. Analytics module 118 analyzes transaction data of a cardholder to identify merchant recommendations and/or zone recommendations. For example, analytics module 118 may identify one or more merchants frequently visited by the cardholder outside a home zone and identify same or similar merchants inside the home zone, to make recommendations to the cardholder regarding the same or similar merchants. Zone altering module 120 alters zones based on transaction data or cardholder input. For example, zone altering module 120 may alter an existing zone or creates a new zone based on data received from a user device (i.e., the customized website or the service application) or may automatically alter the zone based on the transaction data without cardholder involvement. Alert module 122 transmits an alert or a message to a cardholder or an issuer. For example, in one embodiment, alert module 122 transmits a recommendation to the cardholder to enlarge or reduce the zone or create a new zone. In another embodiment, alert module 122 transmits an alert to the user, wherein the alert includes information identifying the zone that the user is entering or leaving. In still another embodiment, alert module 122 transmits an alert to a cardholder and/or an issuer in the event that the cardholder travels inside or outside a zone and/or transaction activity occurs inside or outside a zone. In yet another embodiment, alert module 122 transmits a merchant recommendation to the user. For example, the alert or the message may be transmitted as Application Programming Interface (API) calls or web-based messages. In other embodiments, the alert or the message may be transmitted using other communication formats, including email messages, SMS messages, and/or any other communication format.

Although only one issuer 112, one payment processor 110, one user 111, and one client system 106 are illustrated, it should be understood that system 102 may include any number of issuers 112, users 111, payment processors 110, and/or client systems 106 in communication with geofence computing device 104.

Figure 2:
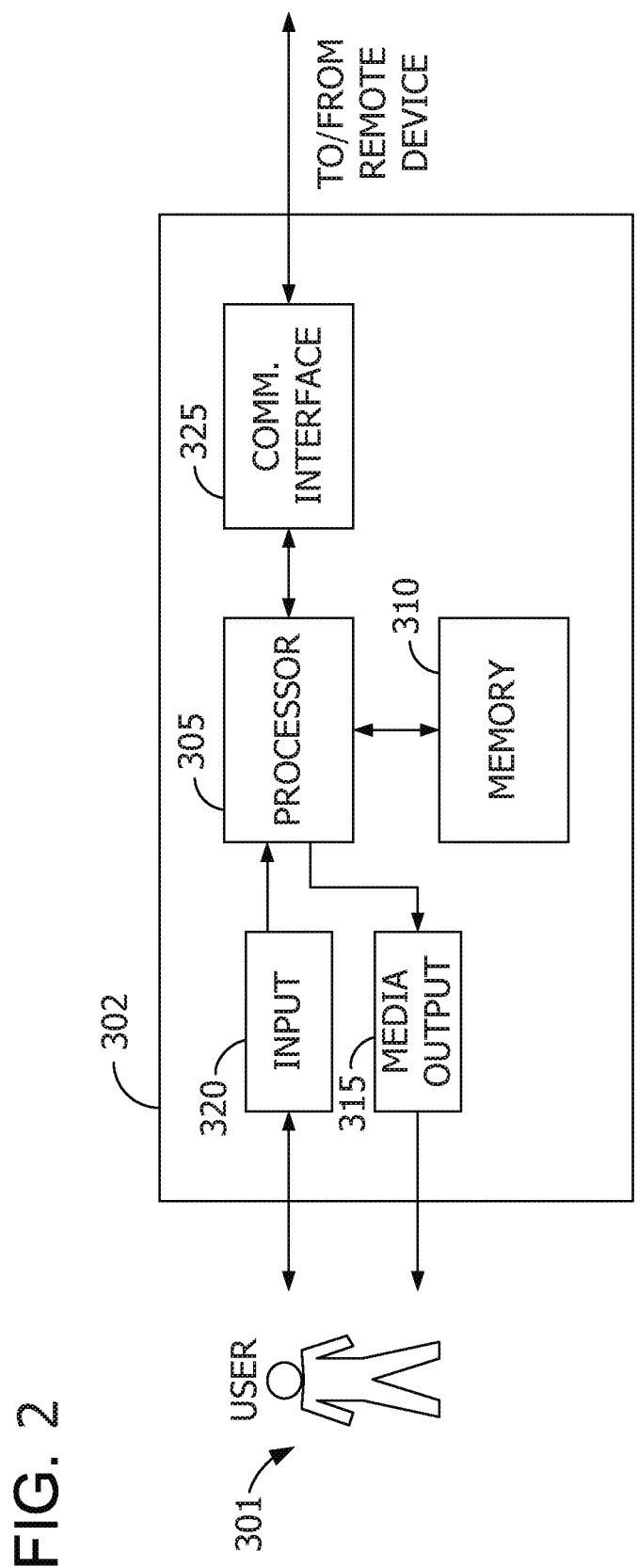

FIG. 2 illustrates an example configuration of a user system 302 operated by a user 301, such as a cardholder. User system 302 may include, but is not limited to, client systems 106 (including mobile computing devices). In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

User system 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively couplable to a remote device such as payment processor 110 and/or geofence computing device 104. Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website. A client application allows user 301 to interact with a server application from a server system.

In some embodiments, user system 302 includes a global positioning system (GPS) sensor integral with communication interface 325, input device 320, or as a separate component. The GPS sensor is configured to receive signals from a plurality of GPS satellites and to determine the location of the GPS sensor and the mobile device using the signals. More specifically, the GPS sensor determines geolocation information for user system 302. The geolocation information may be calculated, for example, by communicating with satellites using communication interface 325. The GPS sensor determines the location of the mobile device and, therefore, the location of mobile device user (i.e., user 301). For example, the GPS sensor functions as a GPS receiver and receives signals from at least three GPS satellites. The received signals include a time stamp at which the signal was sent and a satellite identifier. The GPS sensor is configured to "reverse engineer" the locations of the GPS satellites and, from the satellites' positions, determine its own location based on how long it took (from the time each signal was sent) to receive each signal. In some cases, the GPS sensor is configured to analyze other data streams to supplement this location-determination process. For example, the GPS sensor may access cellular tower data (e.g., by "pinging" a nearby cell tower) to determine its approximate location and, from that information, only analyze signals from the three nearest GPS satellites. User system 302 may additionally or alternatively include other components such as an accelerometer, gyroscope, and/or any other position and/or location-determining components.

Figure 3:
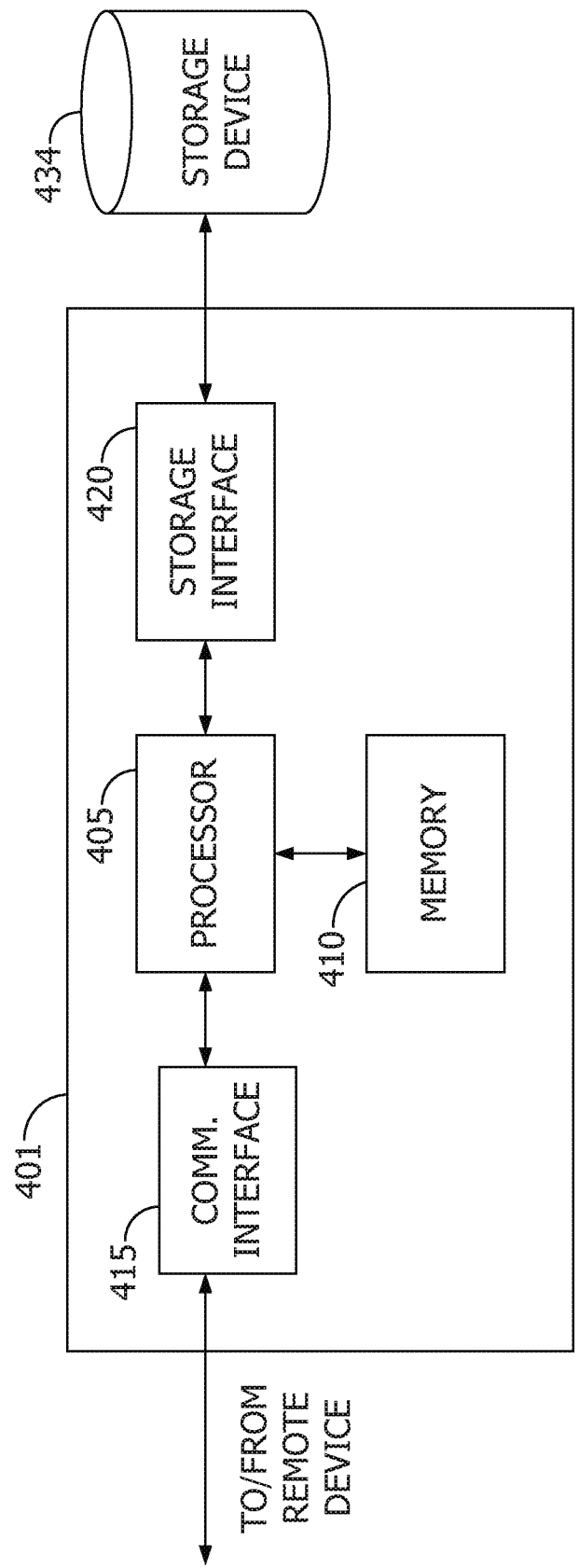

FIG. 3 illustrates an example configuration of a server system 401 such as payment processor 110 (shown in FIG. 1) and geofence computing device 104 (shown in FIG. 1). Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device such as a user system or another server system 401. For example, server system 401 may be geofence computing device 104, wherein communication interface 415 may receive data from payment processor 110.

Processor 405 may also be operatively coupled to a storage device 434. Storage device 434 is any computer-operated hardware suitable for storing and/or retrieving data. In some embodiments, storage device 434 is integrated in server system 401. For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory area 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

FIG. 4 is an example embodiment of a map 500 of zones generated by a geofence computing device and displayed in a customized website and/or a service application shown on a display device. Map 500 includes zones 502, 504, 506, and 508 designated by a cardholder using the procedure described above. Zone 502 is designated, for example, an all-spend zone, wherein all merchants within the zone are approved for transactions. A boundary for zone 502 was, for example, created by the cardholder by designating a location, such as an address, coordinates, or a zip code, and applying a zone radius from a center point of the location.

Zone 504 is designated, for example, a target-spend zone, wherein selected merchants within the zone are approved for transactions. Zone 506 is designated, for example, a no-spend zone, wherein no merchants within the zone are approved for transactions. In one embodiment, boundaries for zones 504 and 506 were created by the cardholder by using an input device to draw zone perimeters on map 500 displayed in the customized website or the service application. In another embodiment, boundaries for zones 504 and 506 were created by the cardholder by designating a location and applying a zone radius from a center point of the location. The geofence computing device later dynamically altered the radiuses of zones 504 and 506 based on cardholder transaction data, thereby creating the irregular circles.

Zone 508 is, for example, a mini-zone, such as for a mall, designated as an all-spend zone. A boundary for zone 508 was, for example, created by the cardholder by entering a name of the mall into the customized web site or the service application. The geofence computing device then creates the mini-zone around the mall.

In the example embodiment, a geofence computing device received transaction data or GPS data that denotes the location of the cardholder. The geofence computing device may use map 500 to provide a location of a cardholder in a manner useful to the cardholder. For example, geofence computing device may identify a location of the cardholder on map 500 as a dot or an icon (not shown).

FIG. 5 is an example method 600 for creating and monitoring a zone using a geofence computing device. A cardholder accesses a customized website or a service application in communication with the geofence computing device. The geofence computing device receives 602 a location, a zone radius, and a zone type (hereafter, referred to as "perimeters'). The geofence computing device creates 604 a zone based on the perimeters. The geofence computing device receives 606 from the cardholder one or more payment card numbers of payment cards that apply to the zone.

The geofence computing device receives 607 transaction data associated with the cardholder and a merchant, wherein the transaction data includes a payment card number and a location of the merchant. The geofence computing device determines 608 a location of the cardholder. The location of the cardholder may be determined based at least in part on (i) the merchant location associated with the transaction data, and/or (ii) wireless data and/or other geolocation data such as electronic device location data, geotemporal data, or geopositioning data. Depending on the cardholder's location, the embodiment, and the zone type, the geofence computing device takes no action 610 (i.e., does not flag an authorization request message), flags 612 an authorization request message to an issuer, or declines 614 an authorization request on behalf of the issuer.

Figure 6:
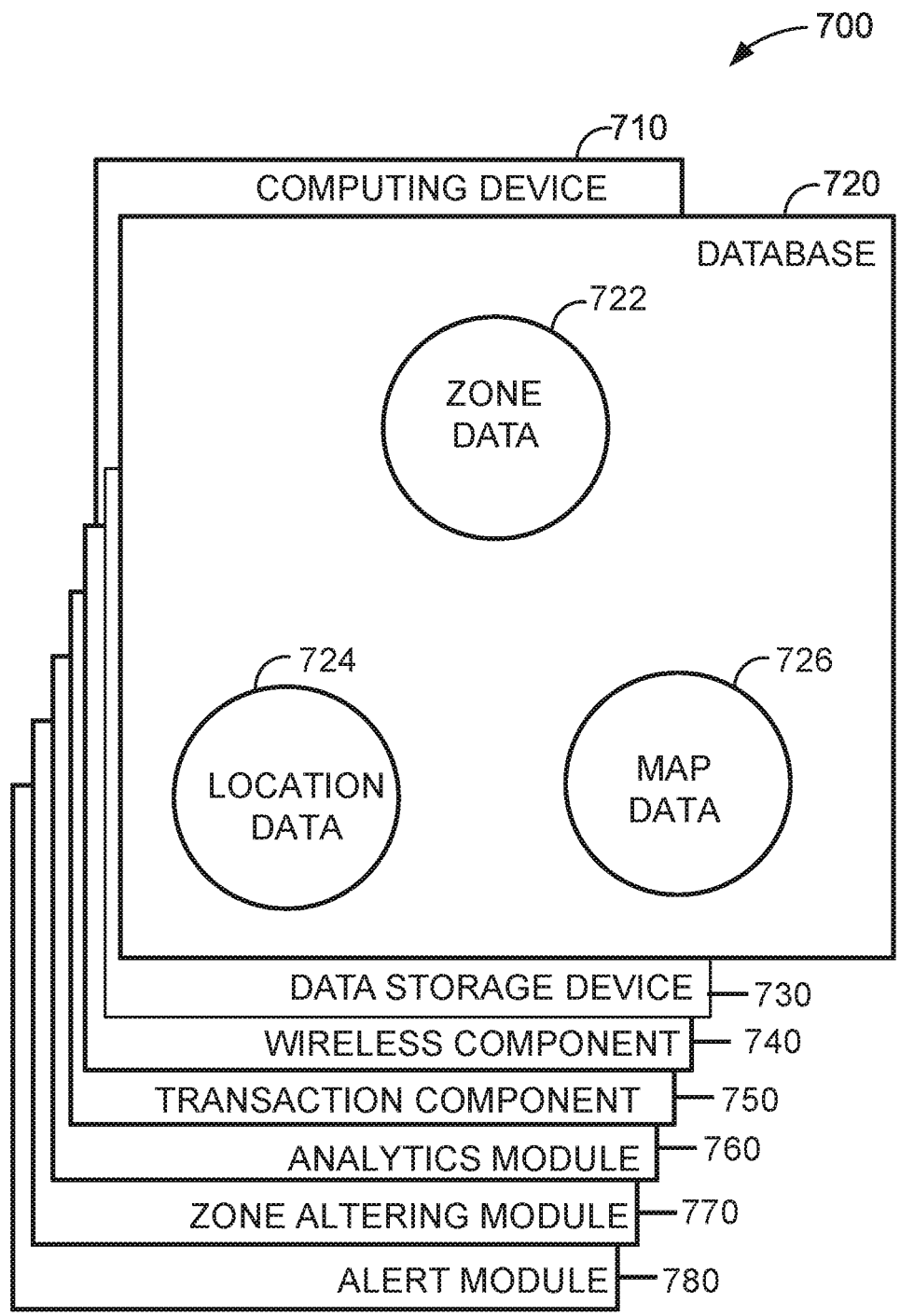

FIG. 6 shows an example configuration 700 of a database 720 within a computing device 710, along with other related computing components, that may be used to create, organize, and monitor zones based at least in part on wireless signal data and payment card transactions. In some embodiments, computing device 710 is the same or similar to geofence computing device 104. Database 720 is coupled to several separate components within computing device 710, which perform specific tasks.

In the example embodiment, database 720 includes zone data 722, location data 724, and map data 726. In some embodiments, database 720 is similar to database 116 (shown in FIG. 1). Zone data 722 includes information associated with geofence zones. Location data 724 includes information associated with locations of payment card transactions and point-of-sale devices. Map data 726 includes data associated with a plurality of maps, for example, map 500 (shown in FIG. 4).

Computing device 710 includes the database 720, as well as data storage devices 730. Computing device 710 also includes a wireless component 740 for receiving and analyzing wireless data to determine a cardholder's location. Computing device 710 also includes a transaction component 750 for correlating the locations of payment card transactions with merchants and cardholders, and for matching account identifiers. An analytics module 760 is included for analyzing transaction data of a cardholder to make merchant recommendations and/or zone recommendations. Further included is a zone altering module 770 for altering a zone based on transaction data or cardholder input. Computing device 710 also includes an alert module 780 for transmitting an alert to a cardholder or an issuer.

Figure 7:
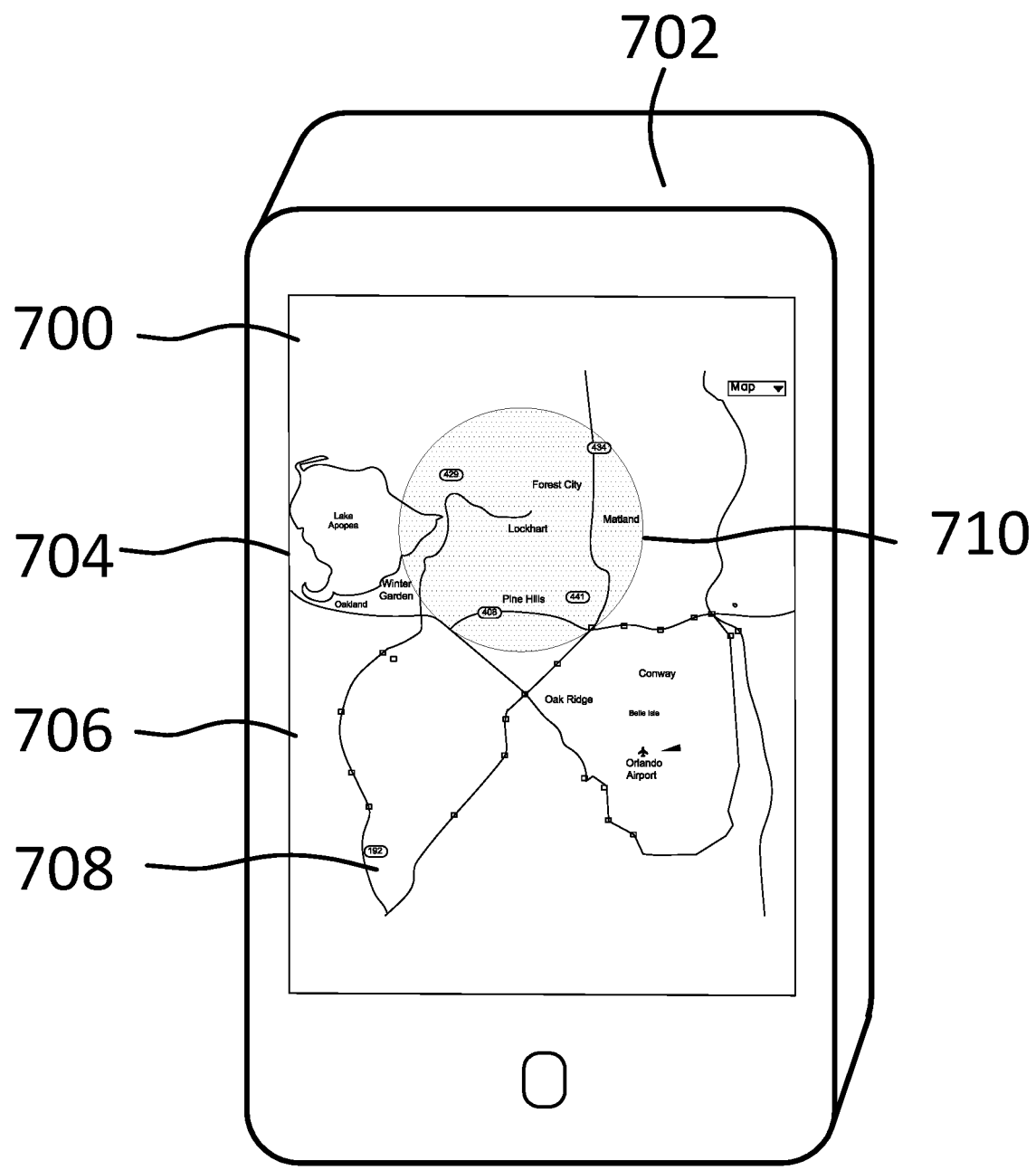
FIG. 7 shows an example graphical user interface (GUI) of a user device, such as the client system shown in FIG. 2, operated by a user to create, organize, and monitor zones.

FIG. 7 shows an example graphical user interface (GUI) 700 of a user device 702, such as client systems 106 (shown in FIG. 1) and/or user system 302 (shown in FIG. 2), operated by user 111 (shown in FIG. 1) to create, organize, and monitor zones. In the example embodiment, user device 702 is a mobile computing device. User device 702 may include, for example, mobile phones, smartphones, personal digital assistants (PDAs), and/or any device capable of executing stored computer-readable instructions.

User device 702 includes at least one media output component 704 for presenting information to user 111. Media output component 704 is any component capable of conveying information to user 111, such as a touch screen. User device 702 further includes an input device 706 for receiving input from user 111. In the example embodiment, input device 706 is a touch sensitive panel, such as a touch screen. However, in alternate embodiments, input device 706 may include, for example, a keyboard, a pointing device, a mouse, a stylus, a gyroscope, an accelerometer, a position detector, or an audio input device. A single component such as a touch screen may function as both an output device of media output component 704 and input device 706. User device 702 may also include a communication interface, such as communication interface 325 (shown in FIG. 2), that is communicatively couplable to a remote device such as server system 102 (shown in FIG. 1) and/or geofence computing device 104 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in a memory area with user device 702 are, for example, computer readable instructions for providing GUI 700 to user 111 via media output component 704 and receiving and processing input from GUI 700 via input device 706. GUI 700 may include, among other possibilities, a web browser and/or a service app. In one embodiment, GUI 700 enables user 111 to display and interact with media and other information typically embedded on a customized website (e.g., customized website 108 shown in FIG. 1) or a service app (e.g., software application 107 shown in FIG. 1) from server system 102 and/or geofence computing device 104. In some embodiments, the service app includes a digital wallet.

In the example embodiment, user 111 uses GUI 700 to create, organize, and/or monitor zones to manage transaction authorizations in order to prevent fraud. More specifically, user 111 uses GUI 700 in association with geofence computing device 104 to create one or more zones for one or more payment cards. In one embodiment, GUI 700 prompts user 111 to input one or more locations for zones. GUI 700 may provide one or more input methods for user 111 to input locations. As one example, GUI 700 may provide a text entry field for entry of physical addresses of the locations, such as street addresses, ZIP codes, and/or ZIP+4 codes. GUI 700 may also provide a text entry field for entry of a zone radius. As another example, GUI 700 may provide an interactive map to user 111, such that user 111 may select (e.g., tap, circle, draw, etc.) one or more locations. More specifically, user 111 can specify the boundary of a zone by using input device 706 to draw a perimeter on a map displayed by GUI 700. For example, FIG. 7 shows a map 708 displayed in GUI 700 on a touch sensitive panel. User 111 may use a finger to specify a zone boundary on map 708, such as circling zone boundary 710. GUI 700 further enables user 111 to enter a zone type for the zone and one or more account identifiers, such as a payment account number (PAN) of a payment card or cards, which apply to the zone. For example, GUI 700 may further present a drop-down menu with a list of zone types from which user 111 may choose for each zone. In such an embodiment, geofence computing device 104 applies the user input into GUI 700 as the defined boundary.

In some embodiments, the service app may use the user input entered using GUI 700 described above to generate zones. Each zone defined by user 111 is stored by the service app in a memory accessible to the service app. The memory may be additionally or alternatively accessible by user device 702. The service app may perform one or more processes using the zone information on behalf of server system 102 and/or geofence computing device 104. For example, where the service app includes a digital wallet for use at a physical merchant, the service app may determine whether user 111 is within one or more zones stored in the memory using merchant geographic location information included within transaction data received by the digital wallet. The service app then determines, using the geographic location of the merchant provided in the transaction data, whether user 111 is inside or outside the one or more zones stored in the memory. In an alternative embodiment, the service app determines whether user 111 is within one or more zone stored in the memory by receiving a location determination of a user's wireless device (e.g., a GPS location of user device 702). The service app compares the location determination to the one or more zones stored in memory. User device 702 and/or the service app may send an advisory signal to the service provider regarding whether user 111 is inside or outside a zone. In another embodiment, when user device 702 leaves a zone stored in memory, the service app is configured to automatically generate an alert that appears on GUI 700.

User 111 can also use GUI 700 to view a map of one or more created zones, as shown in FIGS. 4 and 7. GUI 700 uses the zones saved in the memory or receives zone data from geofence computing device 104 to display the one or more zones on the map.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A geofence computing device for creating and monitoring geofence zones, the geofence computing device in communication with a user device and a payment processor, the user device being a mobile computing device associated with a user, the geofence computing device comprising:
  a memory; and
  a processor in communication with the memory, wherein the processor is configured to:
    receive geofence data via the Internet from an application executing on the user device, the geofence data including a user defined geofence zone, a user defined geofence rule associated with the geofence zone, and an account identifier of the user associated with the geofence zone, wherein the geofence zone is a geographic area, and wherein the geofence rule is a transaction limitation associated with being one of inside and outside the geographic area;
    store the geofence data within the memory;
    receive, from the payment processor, historical transaction data associated with the account identifier, the historical transaction data representing a plurality of previously completed payment transactions initiated by the user, the historical transaction data including, for each of the previously completed transactions, a historical merchant location and a historical merchant identifier;
    receive, from the payment processor, a currently pending authorization request message including transaction data associated with the account identifier, the transaction data representing a currently pending payment transaction initiated by the user with a merchant;
    determine, from the transaction data in the currently pending authorization request message, a geographic location of the merchant;
    retrieve, from the memory using the account identifier included in the transaction data in the currently pending authorization request message, the geofence data including the user defined geofence zone;
    compare the merchant geographic location to the user defined geofence zone;
    apply the geofence rule based on: (i) the comparison of the merchant geographic location to the user defined geofence zone and (ii) a comparison of the transaction limitation to the transaction data in the currently pending authorization request message received from the payment processor;
    add a flag to the authorization request message in response to the transaction violating the geofence rule;
    compare, in response to the transaction violating the geofence rule, the merchant geographic location to the historical merchant locations corresponding to the historical transaction data;
    cause to be displayed on a graphical user interface of the user device, via Internet communication with the application executing on the user device, in response to the comparison, a recommendation to the user based on the comparison between the merchant geographic location and the historical merchant locations, wherein the recommendation is one of (i) to alter the user defined geofence zone to include or exclude the merchant geographic location or (ii) to create a new geofence zone including the merchant geographic location and the geofence rule;

receive, in response to the displayed recommendation, via Internet communication with the application executing on the user device, user input into the graphical user interface from the user device; and in response to the user input, update the stored geofence data in the memory to one of (i) alter the user defined geofence zone and (ii) create the new geofence zone.

2. The geofence computing device of claim 1, wherein the user defined geofence rule includes transaction limitations associated with at least one of a no-spend zone, an all-spend zone, a target-spend zone, a merchant category, or a time constraint.

3. The geofence computing device of claim 1, wherein the processor is further configured to add the flag to the authorization request message when the merchant geographic location is (i) within a no-spend zone, (ii) outside an all-spend zone, or (iii) within a target-spend zone and the transaction data originated with an unapproved merchant within the target-spend zone.

4. The geofence computing device of claim 1, wherein the processor is further configured to automatically decline the payment transaction without providing the authorization request message to an issuer when the transaction violates the geofence rule.

5. The geofence computing device of claim 1, wherein the processor is further configured to create the user defined geofence zone by:
receiving a central location from the user device;
receiving a distance radius from the user device; and
creating the user defined geofence zone based on the central location and the distance radius.

6. The geofence computing device of claim 1, wherein the processor is further configured to create the user defined geofence zone based on at least one of city, state, county, or municipality information received from the user device.

7. The geofence computing device of claim 1, wherein the processor is further configured to:
receive a plurality of transaction data associated with the user from the payment processor;
analyze the plurality of transaction data to determine one or more transactions occurring with one or more merchants located outside the user defined geofence zone; and
automatically alter the user defined geofence zone stored with the memory such that the one or more merchants are inside the altered geofence zone.

8. The geofence computing device of claim 1, wherein the processor is further configured to:
monitor a location of the user based on a GPS signal;
determine that the user is entering or leaving the user defined geofence zone based on the GPS signal; and
transmit an alert to a user device indicating that the user is entering or leaving the user defined geofence zone.

9. A computer-implemented method for creating and monitoring geofence zones, the method implemented using a geofence computing device including a processor in communication with a memory, a user device, and a payment processor, the user device being a mobile computing device associated with a user, the method comprising:
receiving geofence data via the Internet from an application executing on the user device, the geofence data including a user defined geofence zone, a user defined geofence rule associated with the geofence zone, and an account identifier of the user associated with the geofence zone, wherein the geofence zone is a geographic area, and wherein the geofence rule is a transaction limitation associated with being one of inside and outside the geographic area;
storing the geofence data within the memory;
receiving, from the payment processor, historical transaction data associated with the account identifier, the historical transaction data representing a plurality of previously completed payment transactions initiated by the user, the historical transaction data including, for each of the previously completed transactions, a historical merchant location and a historical merchant identifier;
receiving, from the payment processor, a currently pending authorization request message including transaction data associated with the account identifier, the transaction data representing a currently pending payment transaction initiated by the user with a merchant;
determining, from the transaction data in the currently pending authorization request message, a geographic location of the merchant;
retrieving, from the memory using the account identifier included in the transaction data in the currently pending authorization request message, the geofence data including the user defined geofence zone;
comparing the merchant geographic location to the user defined geofence zone;
applying the geofence rule based on: (i) the comparison of the merchant geographic location to the user defined geofence zone and (ii) a comparison of the transaction limitation to the transaction data in the currently pending authorization request message received from the payment processor;
adding a flag to the authorization request message in response to the transaction violating the geofence rule;
comparing, in response to the transaction violating the geofence rule, the merchant geographic location to the historical merchant locations corresponding to the historical transaction data;
causing to be displayed on a graphical user interface of the user device, via Internet communication with the application executing on the user device, in response to the comparison, a recommendation to the user based on the comparison between the merchant geographic location and the historical merchant locations, wherein the recommendation is one of (i) to alter the user defined geofence zone to include or exclude the merchant geographic location or (ii) to create a new geofence zone including the merchant geographic location and the geofence rule;
receiving, in response to the displayed recommendation, via Internet communication with the application executing on the user device, user input into the graphical user interface from the user device; and
in response to the user input, update the stored geofence data in the memory to one of (i) alter the user defined geofence zone and (ii) create the new geofence zone.

10. The method of claim 9, wherein the user defined geofence rule includes transaction limitations associated with at least one of a no-spend zone, an all-spend zone, a target-spend zone, a merchant category, or a time constraint.

11. The method of claim 9, wherein the processor is further configured to add the flag to the authorization request message when the merchant geographic location is (i) within a no-spend zone, (ii) outside an all-spend zone, or (iii) within a target-spend zone and the transaction data originated with an unapproved merchant within the target-spend zone.

12. The method of claim 9 further comprising automatically declining the payment transaction without providing the authorization request message to an issuer when the transaction violates the geofence rule.

13. The method of claim 9 further comprising creating the user defined geofence zone by:
   receiving a central location from the user device;
   receiving a distance radius from the user device; and
   creating the user defined geofence zone based on the central location and the distance radius.

14. The method of claim 9 further comprising creating the user defined geofence zone based on at least one of city, state, county, or municipality information received from the user device.

15. The method of claim 9 further comprising:
   receiving a plurality of transaction data associated with the user from the payment processor;
   analyzing the plurality of transaction data to determine one or more transactions occurring with one or more merchants located outside the user defined geofence zone; and
   automatically altering the user defined geofence zone stored within the memory such that the one or more merchants are inside the altered geofence zone.

16. The method of claim 9 further comprising:
   monitoring a location of the user based on a GPS signal;
   determining that the user is entering or leaving the user defined geofence zone based on the GPS signal; and
   transmitting an alert to a user device indicating that the user is entering or leaving the user defined geofence zone.

17. A non-transitory computer-readable storage medium having computer-executable instructions embodied thereon, wherein when executed by a geofence computing device including a processor in communication with a memory, a user device, and a payment processor, the user device being a mobile computing device associated with a user, the computer-executable instructions cause the geofence computing device to:
   receive geofence data via the Internet from an application executing on the user device, the geofence data including a user defined geofence zone, a user defined geofence rule associated with the geofence zone, and an account identifier of the user associated with the geofence zone, wherein the geofence zone is a geographic area, and wherein the geofence rule is a transaction limitation associated with being one of inside and outside the geographic area;
   store the geofence data within the memory;
   receive, from the payment processor, historical transaction data associated with the account identifier, the historical transaction data representing a plurality of previously completed payment transactions initiated by the user, the historical transaction data including, for each of the previously completed transactions, a historical merchant location and a historical merchant identifier;
   receive, from the payment processor, a currently pending authorization request message including transaction data associated with the account identifier, the transaction data representing a currently pending payment transaction initiated by the user with a merchant;
   determine, from the transaction data in the currently pending authorization request message, a geographic location of the merchant;
   retrieve, from the memory using the account identifier included in the transaction data in the currently pending authorization request message, the geofence data including the user defined geofence zone;
   compare the merchant geographic location to the user defined geofence zone;
   apply the geofence rule based on: (i) the comparison of the merchant geographic location to the user defined geofence zone and (ii) a comparison of the transaction limitation to the transaction data in the currently pending authorization request message received from the payment processor;
   add a flag to the authorization request message in response to the transaction violating the geofence rule;
   compare, in response to the transaction violating the geofence rule, the merchant geographic location to the historical merchant locations corresponding to the historical transaction data;
   cause to be displayed on a graphical user interface of the user device, via Internet communication with the application executing on the user device, in response to the comparison, a recommendation to the user based on the comparison between the merchant geographic location and the historical merchant locations, wherein the recommendation is one of (i) to alter the user defined geofence zone to include or exclude the merchant geographic location or (ii) to create a new geofence zone including the merchant geographic location and the geofence rule;
   receive, in response to the displayed recommendation, via Internet communication with the application executing on the user device, user input into the graphical user interface from the user device; and
   in response to the user input, update the stored geofence data in the memory to one of (i) alter the user defined geofence zone and (ii) create the new geofence zone.

18. The non-transitory computer-readable storage medium of claim 17, wherein the user defined geofence rule includes transaction limitations associated with at least one of a no-spend zone, an all-spend zone, a target-spend zone, a merchant category, or a time constraint.

19. The non-transitory computer-readable storage medium of claim 17, wherein the computer-executable instructions further cause the geofence computing device to add the flag to the authorization request message when the merchant geographic location is (i) within a no-spend zone, (ii) outside an all-spend zone, or (iii) within a target-spend zone and the transaction data originated with an unapproved merchant within the target-spend zone.

20. The non-transitory computer-readable storage medium of claim 17, wherein the computer-executable instructions further cause the geofence computing device to automatically decline the payment transaction without providing the authorization request message to an issuer when the transaction violates the geofence rule.

21. The non-transitory computer-readable storage medium of claim 17, wherein the computer-executable instructions further cause the geofence computing device to create the user defined geofence zone by:
   receiving a central location from the user device;
   receiving a distance radius from the user device; and
   creating the user defined geofence zone based on the central location and the distance radius.

22. The non-transitory computer-readable storage medium of claim 17, wherein the computer-executable instructions further cause the geofence computing device to create the user defined geofence zone based on at least one of city, state, county, or municipality information received from the user device.

23. The non-transitory computer-readable storage medium of claim 17, wherein the computer-executable instructions further cause the geofence computing device to:
- receive a plurality of transaction data associated with the user from the payment processor;
- analyze the plurality of transaction data to determine one or more transactions occurring with one or more merchants located outside the user defined geofence zone; and
- automatically alter the user defined geofence zone stored within the memory such that the one or more merchants are inside the altered geofence zone.

* * * * *